(12) United States Patent
Chapman et al.

(10) Patent No.: US 11,372,641 B2
(45) Date of Patent: Jun. 28, 2022

(54) CONTAINERIZING SOURCE CODE FOR EXECUTION IN DIFFERENT LANGUAGE USING DRAG-AND-DROP OPERATION

(71) Applicant: Hypernet Labs, Inc., Redwood City, CA (US)

(72) Inventors: Todd Allen Chapman, Stanford, CA (US); Ivan James Ravlich, Los Altos, CA (US)

(73) Assignee: Hypernet Labs, Inc., Redwood City, CA (US)

( * ) Notice: Subject to any disclaimer, the term of this patent is extended or adjusted under 35 U.S.C. 154(b) by 0 days.

(21) Appl. No.: 17/350,755

(22) Filed: Jun. 17, 2021

(65) Prior Publication Data
US 2021/0311731 A1  Oct. 7, 2021

Related U.S. Application Data

(63) Continuation of application No. 17/014,284, filed on Sep. 8, 2020, now Pat. No. 11,068,260.
(Continued)

(51) Int. Cl.
| | |
|---|---|
| *G06F 3/048* | (2013.01) |
| *G06F 8/76* | (2018.01) |
| *G06F 3/0482* | (2013.01) |
| *G06F 3/0486* | (2013.01) |
| *G06F 9/451* | (2018.01) |

(52) U.S. Cl.
CPC .............. *G06F 8/76* (2013.01); *G06F 3/0482* (2013.01); *G06F 3/0486* (2013.01); *G06F 9/451* (2018.02)

(58) Field of Classification Search
CPC ........ G06F 3/0482; G06F 3/0486; G06F 8/76; G06F 9/451
See application file for complete search history.

(56) References Cited

U.S. PATENT DOCUMENTS

| | | | |
|---|---|---|---|
| 2003/0079177 A1 | 4/2003 | Brintzenhofe et al. | |
| 2005/0155027 A1* | 7/2005 | Wei .......................... | G06F 8/61 |
| | | | 717/176 |

(Continued)

OTHER PUBLICATIONS

International Search Report and Written Opinion, Patent Cooperation Treaty Application No. PCT/US2020/049748, dated Feb. 1, 2021, 15 pages.

(Continued)

*Primary Examiner* — Claudia Dragoescu
(74) *Attorney, Agent, or Firm* — Fenwick & West LLP

(57) ABSTRACT

A system and a method are disclosed containerizing a source code file. In some embodiments, the system detects a command to navigate a user interface to a machine station. The system responsively generates for display using the user interface a station identifier corresponding to the machine station and a drag-and-drop interface. The system receives a source code file by way of a drag-and-drop operation being performed with respect to the drag-and-drop interface. The system selects a machine of the machine station to execute the source code file, containerizes the source code file based on a language used by the selected machine, and commands the selected machine to execute the containerized source code file. The system generates for display results of the executed containerized source code file using the user interface.

20 Claims, 9 Drawing Sheets

Related U.S. Application Data

(60) Provisional application No. 63/060,810, filed on Aug. 4, 2020, provisional application No. 62/907,466, filed on Sep. 27, 2019.

(56) References Cited

U.S. PATENT DOCUMENTS

| | | |
|---|---|---|
| 2008/0204283 A1 | 8/2008 | Krimerman et al. |
| 2016/0092179 A1 | 3/2016 | Straub |
| 2016/0092694 A1 | 3/2016 | Lim |
| 2018/0081648 A1* | 3/2018 | Romero Zaldivar ................ G06F 9/4552 |
| 2019/0079740 A1* | 3/2019 | Sharma ................ G06F 8/34 |

OTHER PUBLICATIONS

Petrovic, "Model-based Approach for Semantic-driven Deployment of Containerized Applications to Support Future Internet Services and Architectures," Serbian Journal of Electrical Engineering, vol. 16, No. 1, Feb. 2018, pp. 21-44, retrieved on [Dec. 23, 2018]. Retrieved from the internet <URL: http://www.doiserbia.nb.rs/img/doi/1451-4869/2019/1451-48691901021 P .pdf>.

\* cited by examiner

CONTAINERIZING SOURCE CODE FOR EXECUTION IN DIFFERENT LANGUAGE USING DRAG-AND-DROP OPERATION

CROSS REFERENCE TO RELATED APPLICATIONS

This application is a continuation of U.S. patent application Ser. No. 17/014,284, filed Sep. 8, 2020, which claims the benefit of U.S. Provisional Application Nos. 62/907,466, filed Sep. 27, 2019, and 63/060,810, filed Aug. 4, 2020, the disclosures of which are hereby incorporated by reference herein in their entireties.

TECHNICAL FIELD

The disclosure generally relates to the field of using remote resources to execute source code, and more particularly relates to containerizing source code for execution using remote resources.

BACKGROUND

Systems for executing compute jobs on remote machines are fraught with steep learning curves, convoluted user interfaces, and complex inter-related tools whose separate operation introduces friction and error. In order to operate these systems, users launch, e.g., remote sessions or clients to interact with a remote machine. Launching these sessions and/or clients requires users to manually install all software dependencies for executing the job, and to have the technical know-how to do so. Yet further, any required data must be manually uploaded by the user to the remote machine. If the user wishes to use a different remote machine, these efforts must be duplicated, possibly with different dependencies specific to the next machine, thus resulting in a burden on the network in duplicating data transfers.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
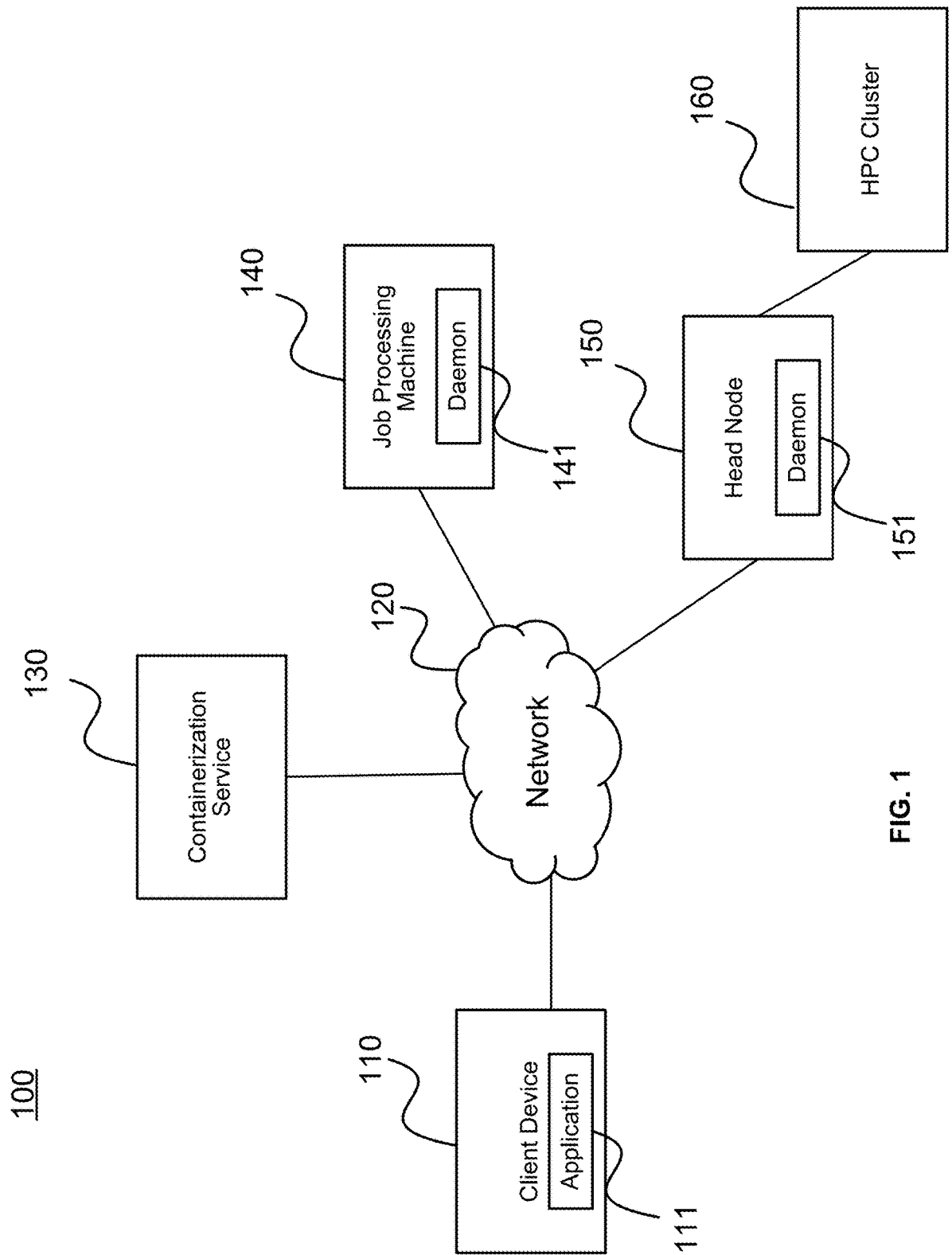
FIG. 1 illustrates one embodiment of a system environment of a containerization service.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Systems and methods are disclosed herein where an end user does not need to have the advanced technical know-how and patience to go through the convoluted process of existing systems to send code to remote machines. The systems and methods disclosed herein provide an improved user interface to an end user that enables the end user to select a machine (whether a local machine or a cloud machine), drag and drop their code to it, and receive results, without needing to set up the remote machine, manually send code, install dependencies, retrieve results, etc. Where the user wishes to use different machines, repeat experiments, or share compute instances with others, the user need not repeat these manual processes, thus resulting in a reduction of use of network resources.

In an embodiment, systems and methods are disclosed herein for providing an improved user interface for executing source code files using remote compute resources. The system detects a command to navigate a user interface to a machine station. Responsive to detecting the command, the system generates for display using the user interface a station identifier corresponding to the machine station and a drag-and-drop interface. The system receives a source code file by way of a drag-and-drop operation being performed with respect to the drag-and-drop interface, and selects a machine of the machine station to execute the source code file. The system containerizes the source code file based on a language used by the selected machine. The system commands the selected machine to execute the containerized source code file, and generates for display results of the executed containerized source code file using the user interface.

In an embodiment, a daemon receives an indication of an available job (e.g., a job received via a drag-and-drop request). The daemon determines whether it has access to compute resources required by the job. Responsive to determining that the daemon has access to the compute resources required by the job, the daemon transmits a claim request for the job. The daemon receives, responsive to the claim request, data describing the job, and generates a container base image based on the data describing the job. The daemon transmits an instruction to a node to run a containerized instance of the job using the container base image, and monitors the node for a termination signal. Responsive to detecting, during the monitoring, the termination signal, the daemon uploads a result, the result being available to a user that submitted the available job based on the uploading.

Containerization Service

FIG. 1 illustrates one embodiment of a system environment of a containerization service. Environment 100 includes client device 110 (with application 111 optionally installed thereon), network 120, containerization service 130, job processing machine 140 (with daemon 141 running thereon), head node 150 (with daemon 151 running thereon), and HPC cluster 160. While only one of each component of environment 100 is depicted, this is for convenience in illustration, and more than one of any given component may be present (e.g., multiple client devices). Moreover, fewer or more components may be used to achieve the functionality described herein in any manner consistent with the disclosure.

Client device 110 may be any device operable by a user, such as a personal computer, laptop, tablet, smartphone, or any other device. Client device 110 outputs for display a user interface for interacting with containerization service 130 (e.g., by way of network communications through network 120). The user interface may be generated by application 111, which may be a dedicated application (e.g., as downloaded from containerization service 130), or may be accessed by way of a browser that is installed on client device 110. The user interface may be used to browse for machines and/or stations, input mission data, request source code file execution, review results, and so on. Further details of the user interface are discussed with respect to, e.g., FIGS. 2-3 below.

Network 120 may be any network suitable for acting as a conduit for communications between the components depicted in environment 100. For example, network 120 may be the Internet or any other form of network.

Containerization service 130 interacts with application 111 to receive job requests, facilitate containerization of source code, and facilitate communication with remote machines (e.g., job processing machine 140 and/or HPC cluster 160) and interim nodes (e.g., head node 150) to have jobs processed. Containerization service 130 enables users to request jobs (e.g., by dragging and dropping code) and to have those jobs processed regardless of target machine specifications (e.g., the source code may be in a language different from one used by the target machine, and the containerization process nonetheless enables execution). Further details of containerization service 130 are described with respect to, e.g., FIG. 2 below.

Job processing machine 140 is a machine that is selected for processing a job requested by client device 110. Job processing machine 140 may have daemon 141 installed thereon. Daemon 141 coordinates containerization service 130 and job processing machine 140 in connection with performance of a job. Manners in which job processing machine 140 is selected and otherwise interacted with by containerization service 130 are discussed in further detail below with respect to FIGS. 2-5.

Head node 150 facilitates job assignments selected for performance by High Performance Computing (HPC) cluster 160 (and/or other machines hidden from a station view of a user). Daemon 151 coordinates containerization service 130 and head node 150 in connection with performance of jobs. Manners in which head node 150 assigns and otherwise schedules jobs for performance by HPC cluster 160 are discussed in further detail below with respect to FIGS. 2-5.

Figure 2:
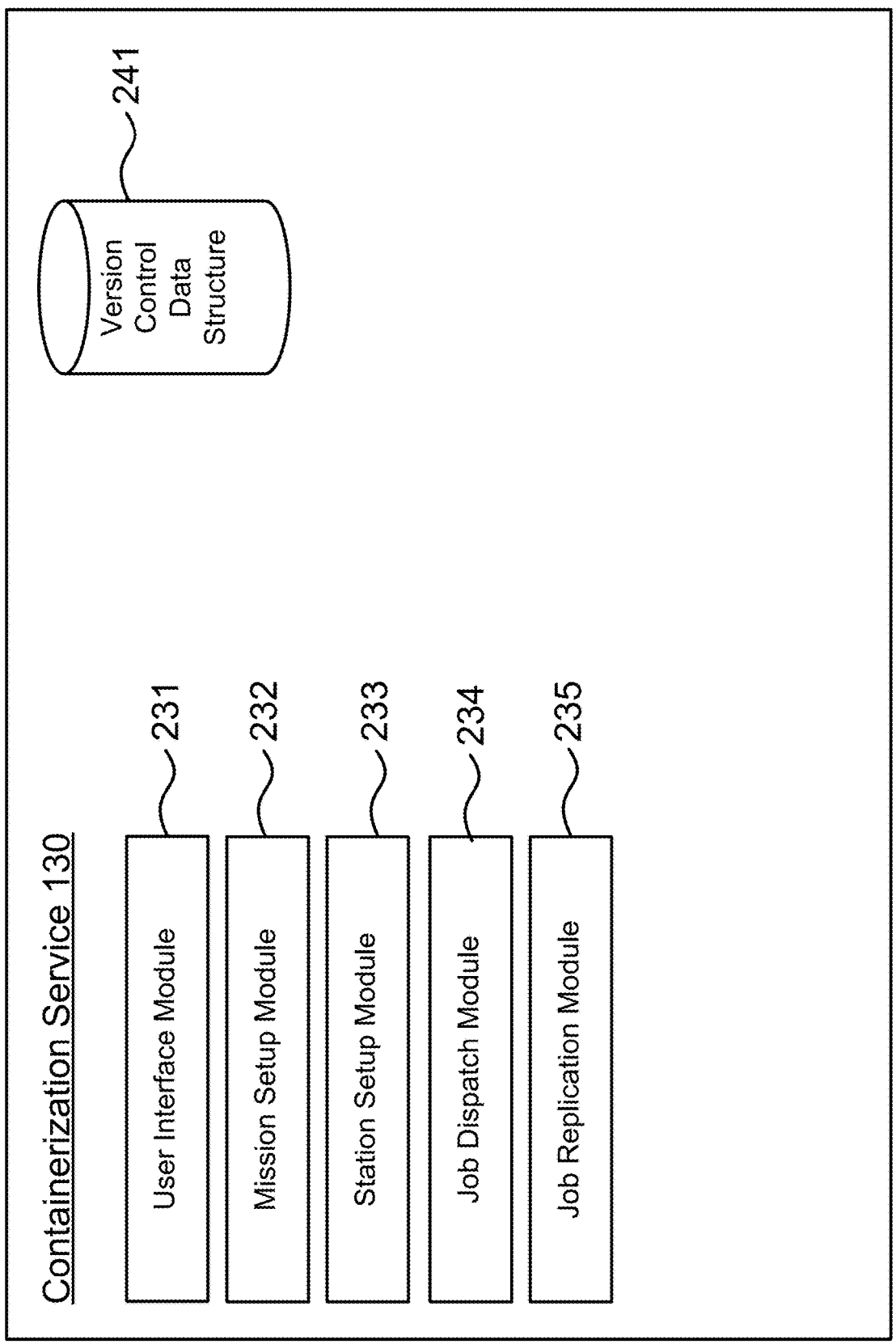
FIG. 2 illustrates one embodiment of exemplary modules and databases of a containerization service.

FIG. 2 illustrates one embodiment of exemplary modules and databases of a containerization service. As depicted, containerization service 130 includes user interface module 231, mission setup module 232, station setup module 233, job dispatch module 234, job replication module 235, and version control data structure 241. The modules and databases depicted in FIG. 2 are merely exemplary; containerization service 130 may use more or fewer modules and databases to achieve the functionality disclosed herein. Some or all functionality of containerization service 130 may be distributed or wholly run by client device 110. For example, some or more modules of containerization service 130 may be partially or wholly included within and/or run by application 111.

User interface module 231 generates for display information at client device 110, and receives user input from client device 110. User interface module 231 may be used to output information to configure missions and may be used to receive information input by the user in inputting the mission. The term missions, as used herein, may refer to reusable and reconfigurable project environments where a user can store, modify, and retrieve input data and/or job results. After a mission is set up, user interface module 231 may be used to enable the user to select parameters (e.g., stations) for running a mission. User interface module 231 may be used to output results of the mission and any other information pertaining to any mission of the user. Further details about stations and running jobs are described with respect to other modules below.

In order to obtain information for a given mission, mission setup module 232 may run a containerization wizard (e.g., using application 111), and detect input into the containerization wizard from the user. The containerization wizard may be used to set up a container using any containerization protocol, such as Docker. The containerization wizard may include a series of prompts for information to the user, the prompts, together, abstracting away a need for the user to know anything about containerized environments or how to configure them for the mission.

In an embodiment, in running the containerization wizard, mission setup module 232 may prompt the user as to a framework for the mission, where the user is requested to input, e.g., specific applications and/or code languages on which a source code file that is to be executed as part of the job depends (e.g., HECRAS, Julia, Python, R, Stata, etc.). The user may then be prompted to add dependencies (e.g., binary dependencies) for their mission, the dependencies being features that successful execution of the source code file depends on. For example, for a Python mission, the dependencies may include 51 degrees-mobile-detector, aadict, abeja-sdk, absi-py, accumulation-tree, acme, adal, and so on. The containerization wizard may prompt the user to input any other information for performing the job, such as selecting arguments to be passed to the mission, customizing computer usage (e.g., the number of cores to use for the mission), enabling computer usage to be automatically selected, and so on. Mission setup module 232 may store the user selections within a data structure that defines parameters for each given mission of the user. The inputs of the user enable a container to be generated such that machines running languages different from those used by the source code file are capable of executing a requested job.

After setup, mission setup module 232 may provide functionality to a user who creates a Mission context to invite collaborators to that Mission, and for the user to control the invited users' access privileges (such as read, write, and execute permissions). Yet further, mission setup module 232 may enable a Mission creator to set a storage source and destination. The storage source and destination may be memory of containerization service 130, and/or may include a third party storage solution (such as S3, Google Storage, etc.) Mission setup module 232 may enable the user to select from where a base containerization image is pulled (Docker Hub, Azure Registry, etc), and/or where result files are to be stored (such as S3, Google Storage, etc) independently of each other. This allows the Mission user to "Bring-Their-Own-Storage" to containerization service 130. This eliminates a need for users to upload such data for each successive experiment, thus eliminating a conventional inefficiency that is imposed by other systems that require data uploads for experimentation to be made to each machine that is used to run the experiment. Containerization service 130 enables users to experiment on different machines (described in further detail below) through a unified interface, thus making one-time uploads of data possible. Thus, this feature improves bandwidth efficiency by enabling one-time uploads of data for use in successive experiments on different machines.

Station setup module 233 may be used to initially configure stations, to re-configure stations, to configure stations for a given job, and to perform any other setup operations in relation to a station. The term station, as used herein, may refer to a grouping of machines for processing jobs that are accessible to authorized users. In an embodiment, station setup module 233 may prompt the user with an to set up their own hub where they can aggregate their resources to be their own cloud provider. For example, the prompt may include a selectable option for a user to configure a station. The configuring user may be an administrator of the station and may assign or transfer the role of administrator to one or more other users. The station administrator may attach machines, users and data to that station. Any user in the station can utilize the resources of the machines and data in the same manner as above. Stations may include users' machines, cloud resources, and/or HPC clusters. Station settings may enable administrators to configure resource policies and users' priorities which may affect how many jobs a user can run at once, resource allocation to given users and jobs, and scheduling priority relative to other user jobs deployed through the same station.

After the station is created, station setup module 233 may prompt the user with an "add machine" selectable option. Responsive to detecting a user selection of the "add machine" option, station setup module 233 may generate for display a prompt for adding a user's machines to the station. The user may add their machines by supplying addresses or other identifiers of those machines. In an embodiment, station setup module 233 identifies machines associated with the user by accessing a user profile and/or by crawling a local network to identify machines associated with the user on the network. Station setup module 233 may generate for display a prompt including selectable options to add any or all of the identified machines to the station. Responsive to a machine being added, station setup module 233 may register that machine to the station.

Station setup module 233 may generate for display an "invite users" selectable option. Responsive to detecting a selection of the "invite users" option, station setup module 233 may invite users to the station. Inviting users to a station may include inviting users to use the machines registered to the station, inviting users to add their own machines to the station, or a combination thereof. Invitations may be sent within containerization service 130 (e.g., to registered accounts of the containerization service), or to third party services (e.g., e-mailed invitations including links to access containerization service 130). Users who are authorized to add machines to the station may do so through the same process described with respect to the administrator. In an embodiment, station setup module 233 may prepopulate suggested users (e.g., based on the user having previously added the suggested users to another station, based on the suggested users having been grouped together in previous stations or teams, based on a domain name of an email address or specific company accounts of suggested users, etc.). Station setup module 233 may include a search bar for a user to search for another user to add to the station. Station setup module 233 searches for the string input into the search tool, and provides search results in the user interface, along with selectable options for selecting found users as well as confirming that the user is to be added.

Stations may be created by other users, by containerization service 130 itself, and/or by any entity. Users may search for stations, and may request authorization to access a station and/or add a machine to a station. The administrator of the station may accept or deny such requests; acceptance of such requests may cause station setup module 233 to add an association between the user and/or the machine of the user to the station. Administrators of a station can control parameters of a station, including what resources are available, how much of a resource a given user can consume at any given time (i.e. cpus, ram, gpus, long term storage, cpu hours, etc), and what access roles members of a Station have (e.g., limiting access to particular machines, limiting resources accessible to a member, limiting an amount of jobs a given user may run, and any other access control).

In an embodiment, in order to make it simple for station administrators to control how many CPU hours, GPU hours, Memory hours, and any other station parameter a particular station member can consume in a period of time, station members may be issued tokens (e.g., HyperCredits). Station setup module 233 may issue a default amount of tokens at a default rate (e.g., 30 tokens a day), or may customize an amount of tokens and/or a rate based on input by an administrator of the station. Containerization service 130 may meter services using the tokens. For example, a station member may be allocated a certain number of HyperCredits that can be utilized in a given time period. Containerization service 130 may calculate the amount of tokens that are consumed by a job (launched from a Mission context) in any suitable manner, such as by multiplying the amount of each resource used by its tokens Cost in hours times the total runtime. Thus, costs to access stations and/or individual machines are established in tokens that is determined by the amount of resources available to it on the machine it is attached to.

Figure 3:
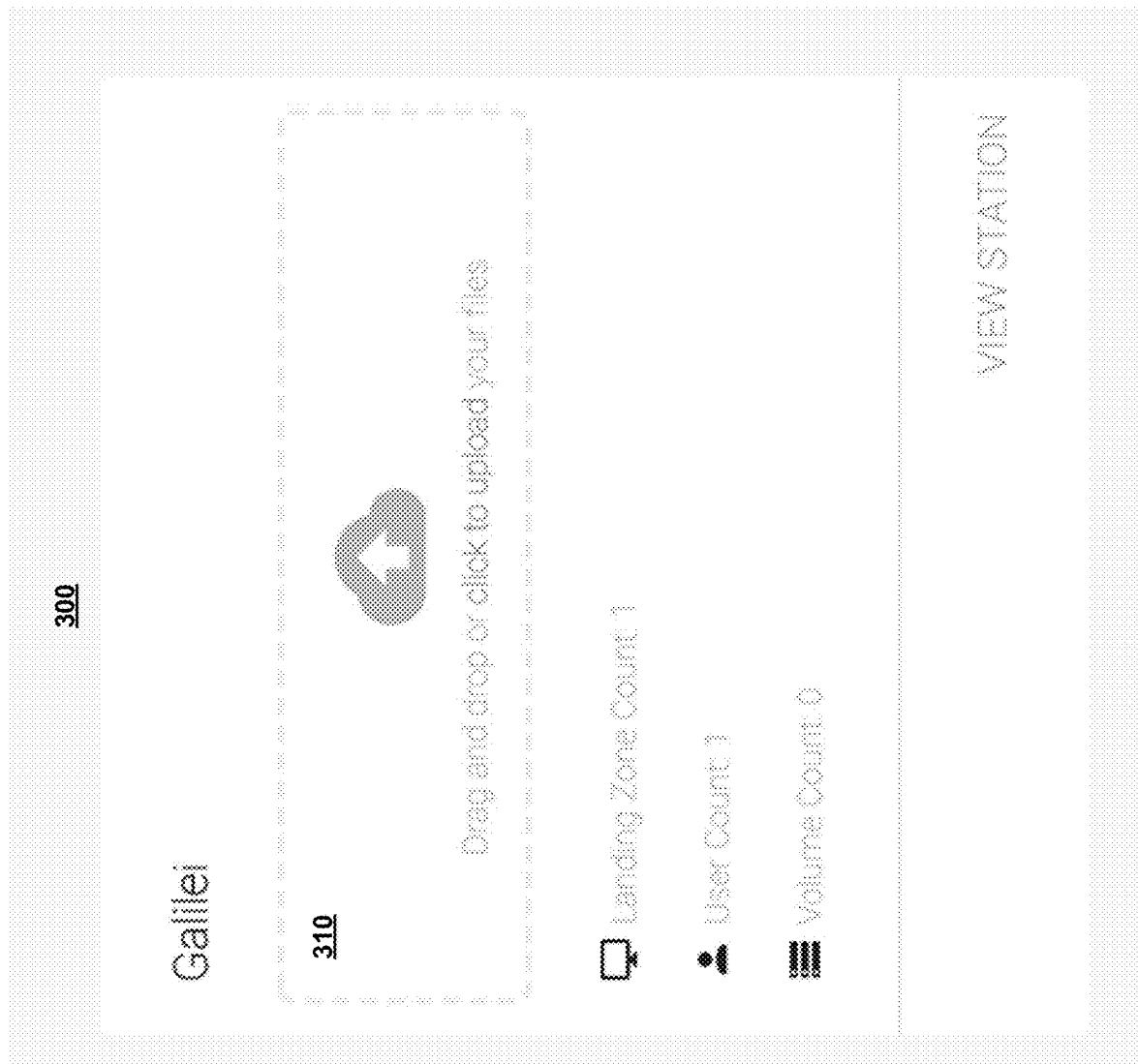
FIG. 3 illustrates an exemplary user interface including a drag-and-drop option for launching a job.

Job dispatch module 234 dispatches a job requested by a user. Job dispatch module 234 monitors for a job request by a user. Turning briefly to FIG. 3 for illustrative purposes, FIG. 3 illustrates an exemplary user interface including a drag-and-drop option for launching a job. User interface 300 depicts a station environment, where the station is named Galelei. The user may have navigated to any station to which the user has access, rather than Galelei, for launching a given job. The user may navigate to a particular machine, rather than a station as a whole, for performing a job. In order to select a station or machine for performing a job, in an embodiment, stations as a whole, and/or machines in a particular station, may be presented to the user based on any number of parameters, such as the frequency of use of machines in a station, the number of times a user has used machines like a particular machine in a station, a particular type of job being launched that matches a given station, a job history indicating that the user had sent a same job to a particular machine in the past, and the like.

Optionally, within user interface 300 information about the station, such as a number of landing zones, a number of users presently running jobs on the station, a volume indicator, and any other information, may be displayed by user interface 300. User interface 300 includes job launch interface 310. A user may launch a job by selecting, using job launch interface 310, a source code file. The user may drag-and-drop an icon corresponding to the source code file into job launch interface 310. Responsive to detecting a selection of a source code file, job dispatch module 234 may begin a process for launching the job in accordance with its corresponding mission parameters. After a job is dispatched, the job is processed by a Daemon. Daemons and job processing particulars are discussed in detail below with respect to FIGS. 4-6.

Job replication module 235 outputs a selectable option to a user to replicate a job. The formation of missions enables the tracking of project history, which are discrete events such as file creating, modification, and deletion. As jobs are dispatched, containerization service 130 may form data structures for storage in version control data structure 241, the data structures indicating job particulars, including mission parameters, source code files that were executed as part of the job, station used to perform the job, machine used to perform the job, job constraints (e.g., constraints on compute resources), and the like. Such data structure enables exact replication of jobs, which is otherwise not possible given that any change in machine or resources may result in a different outcome in job performance. Responsive to receiving selection of the selectable option, job replication module 235 repeats a job using the same source code file, parameters, and machine(s) as was used in a prior run.

Historically, while version tracking has been performed at the source code level to show different stages of development of the code itself, version tracking has not been performed at the project level due to the complexity in doing so. For example, related art systems do not have tools for the purposes of tracking results of computational experiments and the changes to the input code, scripts, data, and binary executables that transpired between successive computational experiments. Missions enables replication of experiments at each iteration by generating a data structure within version control data structure 241 that together shows the input code, scripts, data, and binary executables that transpired at each successive computational experiment, thus ensuring an experiment can be replicated with guaranteed accuracy.

Figure 4:
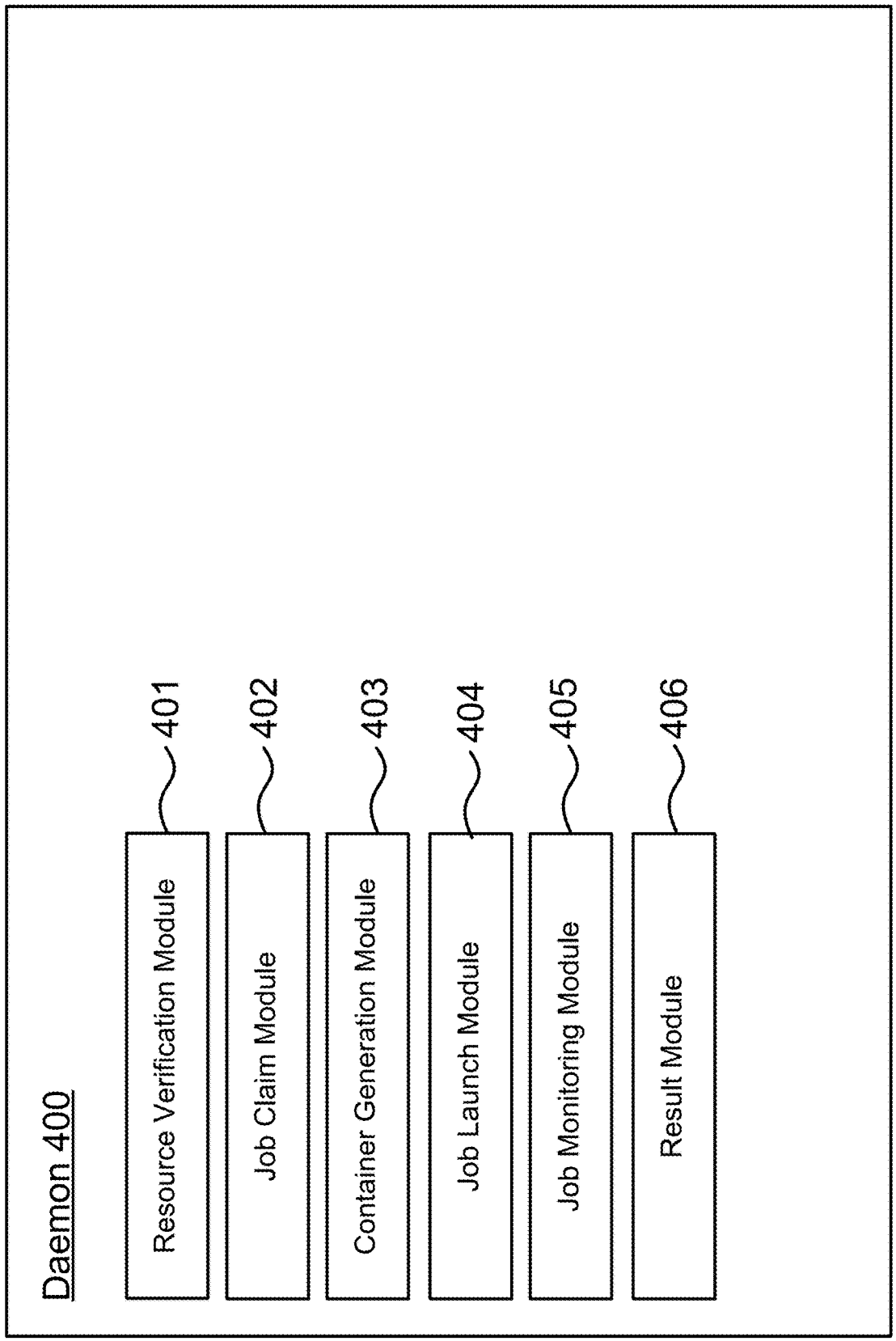
FIG. 4 illustrates one embodiment of exemplary modules of a daemon used by the containerization service.

FIG. 4 illustrates one embodiment of exemplary modules of a daemon used by the containerization service. As depicted, daemon 400 includes resource verification module 401, job claim module 402, container generation module 403, job launch module 404, job monitoring module 405, and result module 406. The modules depicted in FIG. 4 are merely exemplary; fewer or more modules may be used to achieve the functionality of daemon 400 described herein. Daemons may be interchangeably referred to herein as part of landing zones. The term landing zones, as used herein, may refer to a containerized daemon process that communicates with containerization service 130 and runs computational workloads on one or more machines that the daemon is attached to. Landing zone daemons may be attached to some or all machines of a given station, and/or may be attached as dedicated landing zones for individual machines. Landing zone daemons may act in concert with containerization service 130 to schedule jobs.

When a user requests a job, containerization service 130 may poll candidate machines for the job to select which machine will perform the job. Typically, the user has selected a station for performing the job; thus, the candidate machines are machines of the station. In some embodiments, the user may select a subset of machines of a station, or may request that machines having certain available resources perform the job, in which case a subset of the machines of a station that satisfy that request are polled as candidate machines. Containerization service 130 may include, in the poll, an amount of resources that the job requires. The request may be transmitted over network 120 (e.g., using a TLS connection).

Resource verification module 401 of each given daemon (e.g., including daemon 400) that receives the poll determines whether it has sufficient resources to claim the job. For example, resource verification module 401 of daemon 400 compares resources indicated in the poll for the job to available resources to the daemon (e.g., resources of the station associated with the daemon). Responsive to determining that the daemon has sufficient available resources, daemon 400 activates job claim module, which generates and transmits a response to containerization service 130 that includes a claim request that requests to claim the job.

Containerization service 130 receives one or more claim requests from daemon 400 and optionally other daemons that also have resources to perform the job. Containerization service 130 selects, from the daemons that provided claim requests, a daemon 400 to perform the job. In an embodiment, containerization service 130 may select the daemon that first submitted the claim request. In another embodiment, containerization service may select a daemon that satisfies other parameters (e.g., has the most available resources, has resources that can most efficiently perform the job, and so on). Containerization service 130 transmits an instruction to the selected daemon to retrieve job data (e.g., including mission input data and job environment data from a data structure in which the mission data is stored).

Container generation module 403 retrieves the instructed data including, e.g., the mission input data and job environment metadata. Container generation module 403 then builds a job-specific container base image by communicating with the local Container Runtime Interface (such as a Docker engine a Singularity executable, or similar containerization protocol instance).

After the job-specific base image is built, job launch module 404 notifies a scheduler to run a containerized instance of the job-specific base image. The scheduler may be a container runtime interface, a cluster scheduler, a cluster orchestration stack, or any other form of scheduler. While the job is in a running state, job monitoring module 405 monitors the scheduler service (e.g., Container Runtime or Scheduler Service or Orchestration Service, etc.) for events relating to the job, such as a job termination or completion signal. A job may be terminated based on interruption by an administrator and/or machine owner, machine failure, execution failure, completion of the job, or any other such activity. Job monitoring module 405 detects termination of the job responsive to detection of any such signal.

Responsive to detecting a job completion or termination signal (e.g., because a job completed, failed, was interrupted by an administrator, and so on), result module 406 automatically identifies and extracts any relevant files produced by the job container and uploads the results to containerization service 130 for retrieval by the user that originally submitted the job.

Figure 5:
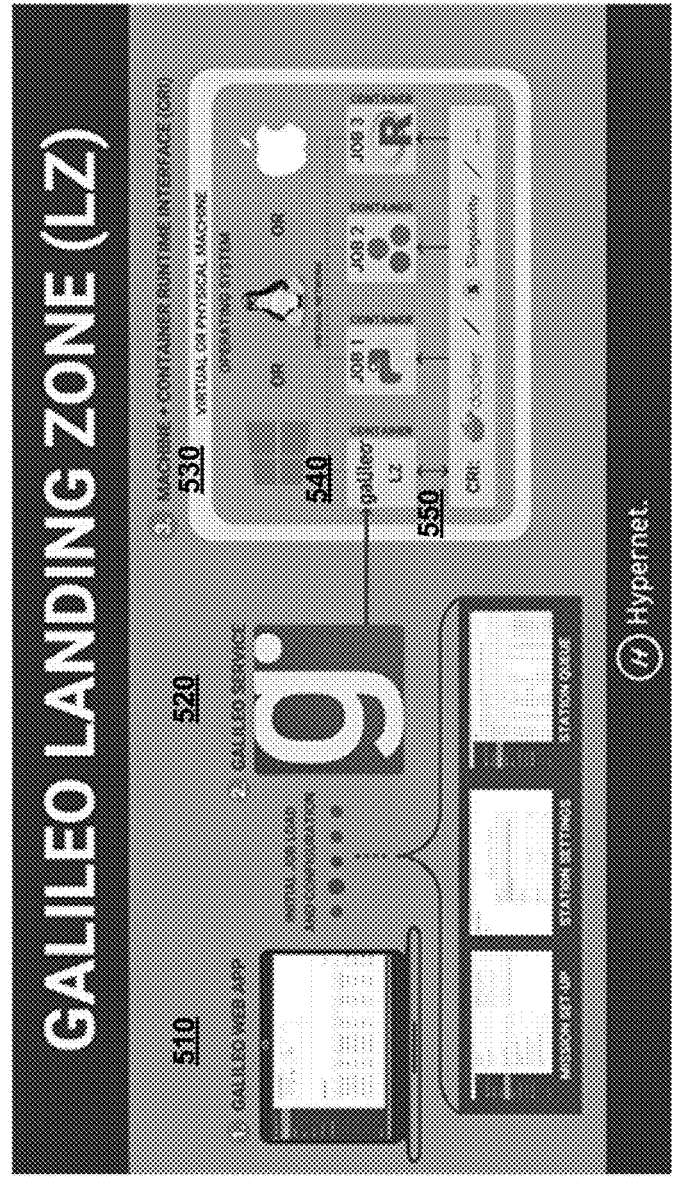
FIG. 5 illustrates one embodiment of an exemplary end-to-end environment for launching a job request by the containerization service using a remote machine.

FIG. 5 illustrates one embodiment of an exemplary end-to-end environment for launching a job request by the containerization service using a remote machine. Environment 500 includes user interface 510, containerization service 520, machine 530, landing zone 540, and scheduler 550. The data flow shown in FIG. 5 depicts an exemplary embodiment of using a containerization service to deploy code to a containerized environment (e.g., Docker, Singularity, etc.) running on an operating system (e.g., OS X, Linux, or Windows) on cloud or traditional computing resources (as opposed to an HPC cluster). As depicted, user interface 510 (e.g., launched by application 111 of client device 110), is used by a user to set up a mission, configure station settings, add a job to a station queue, and perform any other function offered by the application 111 and/or containerization service 530. Containerization service 520 includes the same functionality as containerization service 130 as described with respect to FIGS. 1 and 2. Containerization service 520 coordinates functionality across the various entities shown in environment 500, receives jobs and their configurations from user interface 510, and sends those jobs to machine 530. In sending those jobs to machine 530, the containerization service selects a landing zone 540 (including one or more daemons, such as daemon 400) to process a job. The selection may occur in any manner described above. Landing zone 540 communicates through scheduler 550 and a virtual network with various containers running on machines of a station to run the jobs to completion.

In an embodiment, containerization service 130 may deploy code to High Performance Computing (HPC) resources. HPC is a challenging computational environment to utilize effectively for many practitioners. HPC clusters typically do not provide a graphical user interface, they can be challenging to access via a terminal session due to virtual firewalls and strict security guidelines, and they are designed specifically for running distributed-memory parallel code bases over high-bandwidth, low-latency networks. These codes are themselves difficult to setup and deploy across multiple computational nodes via the cluster scheduling software. In related art implementations, users must write their own scheduler scripts, compile their own codes, and manage the storage and organization of their own results on HPC systems. Yet further, obtaining a user account on an HPC machine can require a lengthy process, and sometimes a background check. When a user deploys a computation workload to an HPC cluster via containerization service 130, however, the users avoid a need to have a user specific account on the HPC cluster or have the know-how to write scheduler scripts, compile their own codes, and so on, which results in reduced administrative costs associated with these complex cyber systems, and which reduces overhead and storage space usage in needing to store and organize results on HPC systems.

In addition to deploying computing workloads, the containerization service 130 can be used as a cluster management tool. Controlling access, permissions, monitoring resource use all within an easy to use interface.

Figure 6:
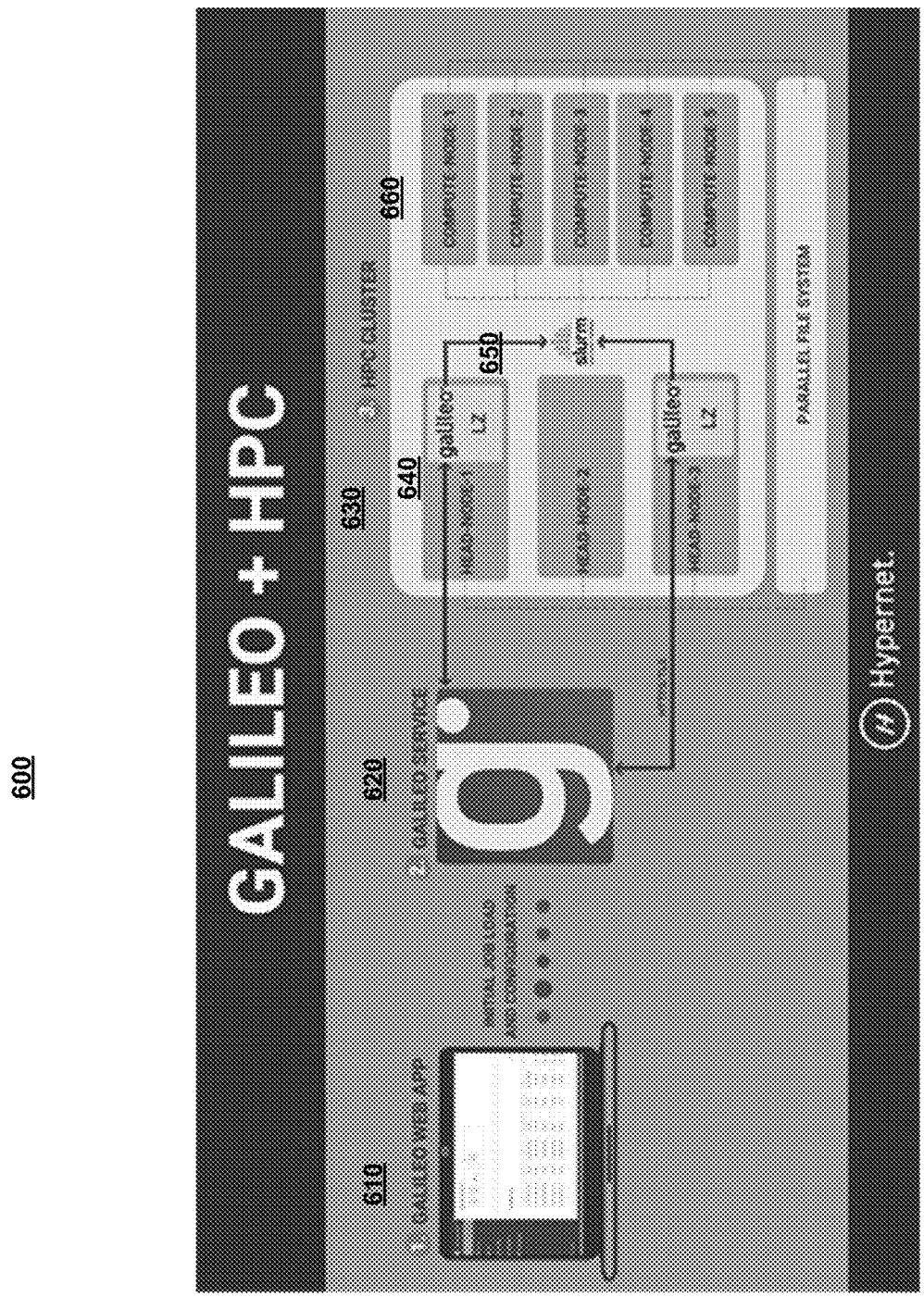
FIG. 6 illustrates one embodiment of an exemplary end-to-end environment for launching a job request by the containerization service using an HPC cluster.

FIG. 6 illustrates one embodiment of an exemplary end-to-end environment for launching a job request by the containerization service using an HPC cluster. Environment 600 includes user interface 610, containerization service 620, HPC cluster 630, head nodes 640, schedule 650, and compute nodes 660. User interface 610 and containerization service 620 operate in a similar manner to how they are described above with respect to their counterparts in FIG. 5. After containerization service 130 deploys a job to a landing zone of a machine (e.g., of a Station that includes an HPC cluster 630 having head nodes 640), the landing zone provides the job to scheduler 650. The term head node, as used herein, may refer to a node that is visible to users as part of a station, where other nodes are not visible. For example, a head node may represent an HPC cluster and may be visible within a station's representation in a user interface, whereas compute nodes may not be visible to a user browsing a station via the user interface. Head nodes need not be particular to HPC clusters; head nodes may be used to represent any other clusters of machines. Head nodes may apply load balancing technology to distribute jobs to hidden machines in a manner that optimizes utilization. Scheduler 650 is depicted as a Slurm scheduler, though any other scheduler may be used, such as Kubernetes. Scheduler 650 deploys jobs to compute nodes 660 of an HPC cluster. In this way, through a user-friendly application 110 having user interface 610, users may load jobs to HPC clusters while avoiding a need for the aforementioned overhead in doing so.

Computing Machine Architecture

Figure 7:
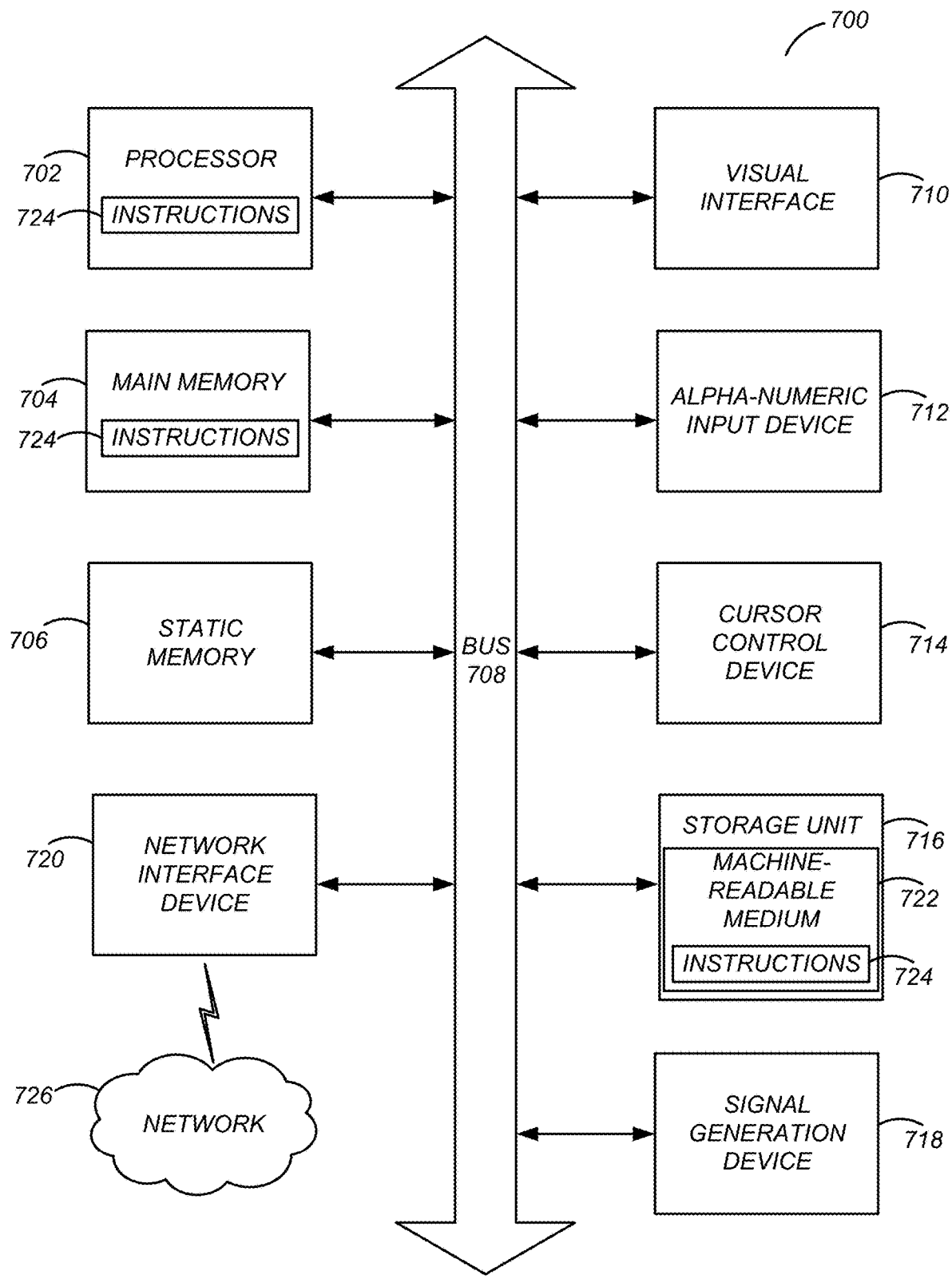
FIG. 7 is a block diagram illustrating components of an example machine able to read instructions from a machine-readable medium and execute them in a processor (or controller).

FIG. (FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Exemplary Containerization Processes

Figure 8:
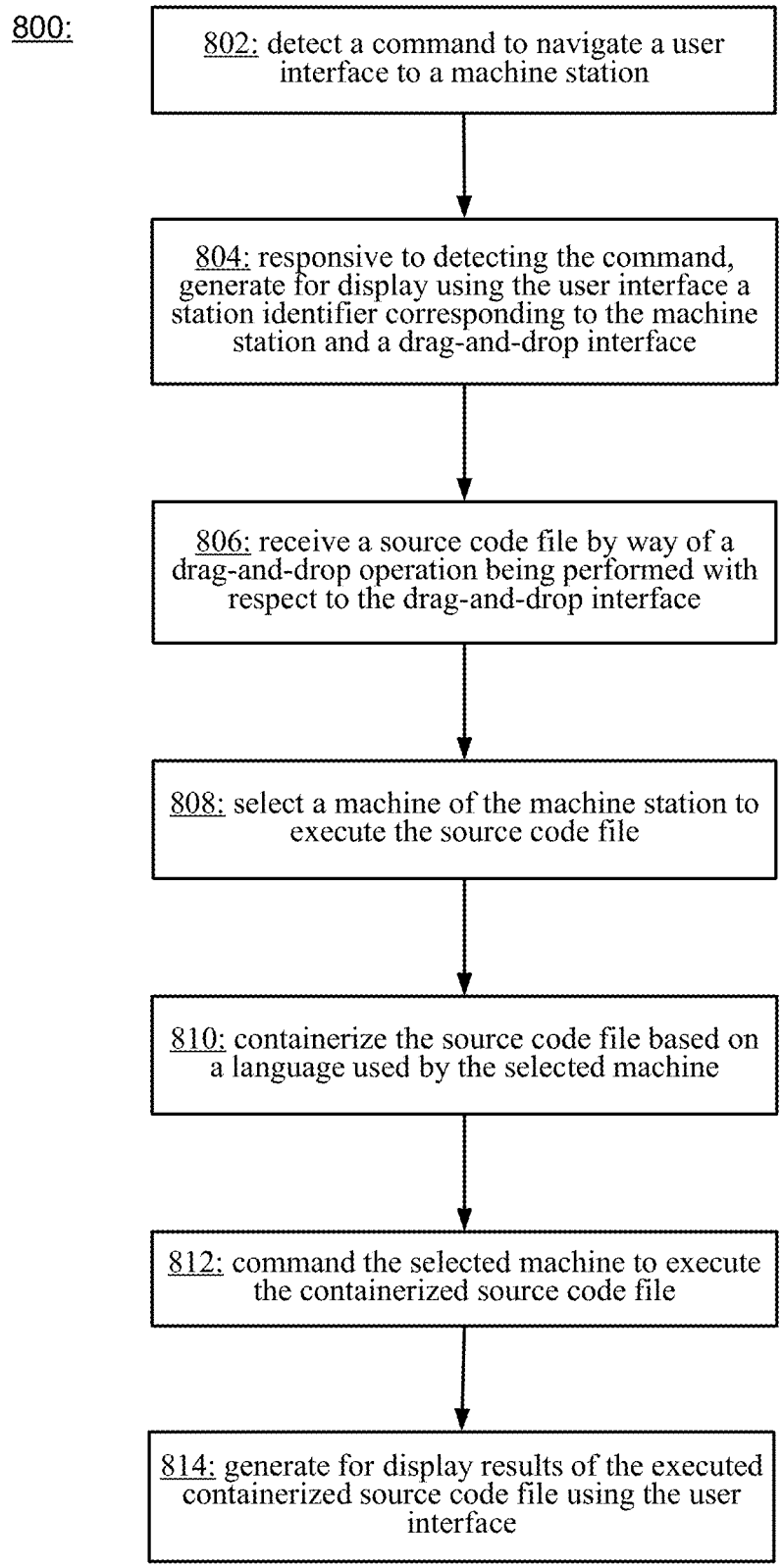
FIG. 8 is an exemplary flowchart illustrating a process for launching a remote compute job using a drag-and-drop operation.

FIG. 8 is an exemplary flowchart illustrating a process for launching a remote compute job using a drag-and-drop operation. Process 800 begins with containerization service 130 detecting 802 a command to navigate a user interface to a machine station (e.g., using user interface module 231). For example, a user may navigate a menu showing many machine stations to a selection of a particular machine station (e.g., Galilei, as shown in user interface 300). Responsive to detecting the command, containerization service 130 generates for display 804 using the user interface (e.g., for display by client device 110 using application 111) a station identifier corresponding to the machine station and a drag-and-drop interface (e.g., job launch interface 310, and the station identifier "Galilei" depicted above job launch interface 310).

Containerization service 130 receives 806 a source code file by way of a drag-and-drop operation being performed with respect to the drag-and-drop interface, and selects 808 a machine of the machine station to execute the source code file. For example, the machine station may include a plurality of candidate job processing machines 140 that are available to execute the source code file. Containerization service 130 may determine resources required to successfully execute the source code file (e.g., based on input into the containerization wizard) and may select a candidate machine with available resources that match or exceed the resources to successfully execute the source code file. As another example, containerization service 130 may determine a present load of each of the plurality of candidate machines and may select two or more candidate machines to execute at least a portion of the source code file based on the present load of each of the plurality of candidate machines. As yet a further example, containerization service 130 may generate for display respective selectable options for each of the plurality of candidate machines (e.g., using application 111), and may receive a user selection of a candidate machine, where containerization service 130 selects the machine for executing the job to be the user-selected candidate machine.

Containerization service 130 containerizes 810 the source code file based on a language used by the selected machine. Containerization service 130 commands 812 the selected machine to execute the containerized source code file, and generates for display 814 results of the executed containerized source code file using the user interface. The user may select the results to repeat the experiment using the same parameters and the same selected machine.

Figure 9:
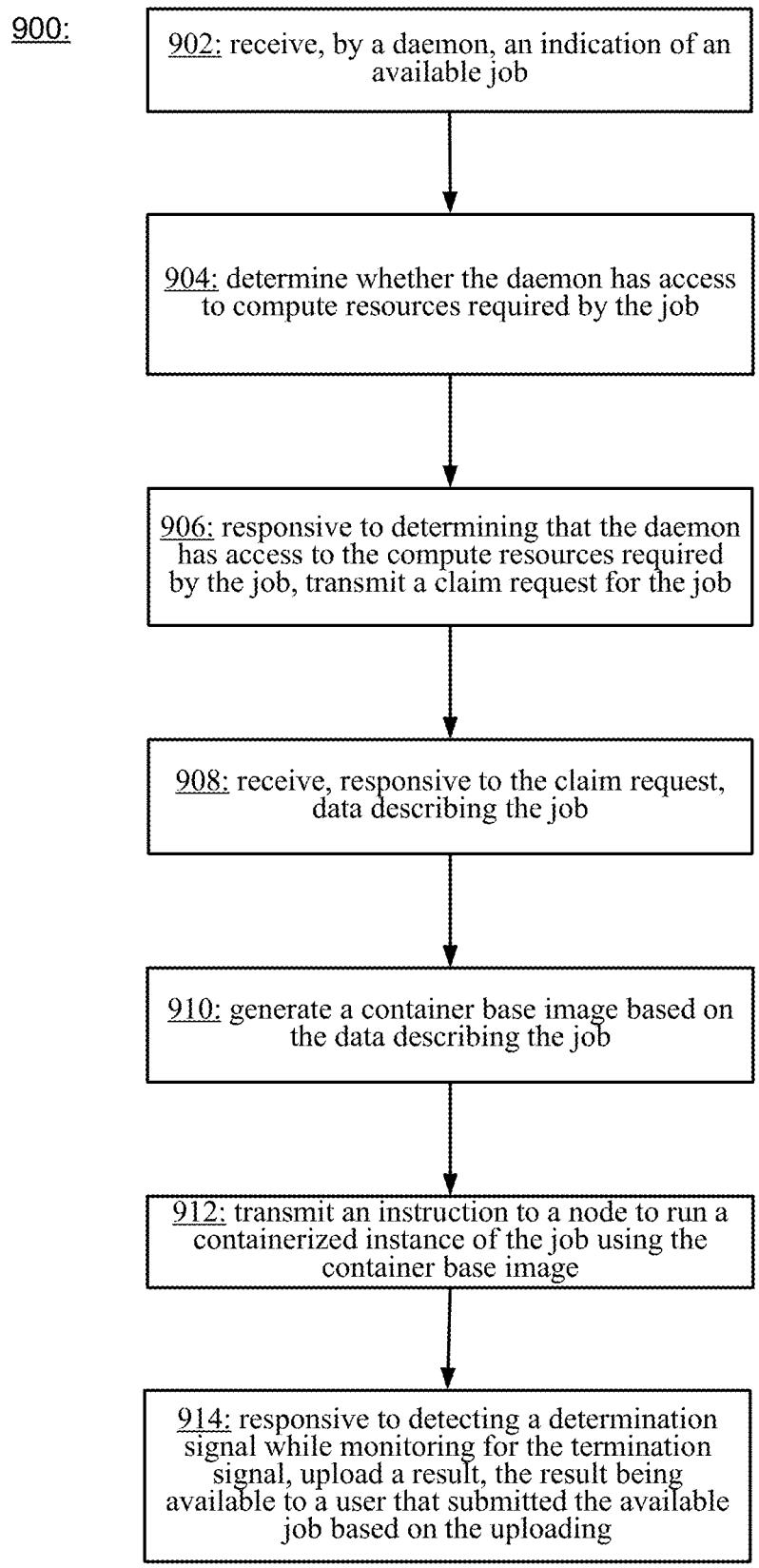
FIG. 9 is an exemplary flowchart illustrating a process for using a containerization service to launch a remote compute job.

FIG. 9 is an exemplary flowchart illustrating a process for using a containerization service to launch a remote compute job. Process 900 begins with daemon 400 receiving 902 an indication of an available job (e.g., as requested by a drag-and-drop request from a user via user interface 300). For example, an indication of the available job may be a poll sent out by containerization service 130 to a plurality of candidate daemons. Daemon 400 determines 904 whether the daemon has access to compute resources required by the job, and, responsive to determining that the daemon has access to the compute resources required by the job, transmits 906 a claim request for the job (e.g., using job claim module 402). The claim request may be authorized responsive to the claim request being a first claim request relative to claim requests from other candidate daemons. The indication of the available job may include a source code file and indicia of a language. An account of a user may have an amount of credits (e.g., HyperCredits) deducted from their account that corresponds to compute resources required by the job.

Daemon 400 receives 908, responsive to the claim request (e.g., where the claim request is authorized), data describing the job, and generates 910 a container base image based on the data describing the job (e.g., using container generation module 403). Daemon 400 transmits 912 an instruction to a node to run a containerized instance of the job using the container base image, and, responsive to detecting 914 a termination signal while monitoring the node for the termination signal, uploading a result, the result being available to a user that submitted the available job based on the uploading. In an embodiment, daemon 400 and/or containerization service 130 generates a data structure that associates a job identifier for the job, an identifier of daemon 400, the source code file, and the indicia of the language. A selectable option may be generated for display to the user corresponding to the data structure, where the job is replicated responsive to detecting a selection of the selectable option.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for containerizing job requests through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving, by a daemon, an indication of an available job;
    determining whether the daemon has access to compute resources required by the job;
    responsive to determining that the daemon has access to the compute resources required by the job, transmitting a claim request for the job;
    receiving, responsive to the claim request, data describing the job;
    generating a container base image based on the data describing the job;
    transmitting an instruction to a node to run a containerized instance of the job using the container base image;
    monitoring the node for a termination signal;
    responsive to detecting, during the monitoring, the termination signal, uploading a result, the result being available to a user that submitted the available job based on the uploading.

2. The method of claim 1, wherein the indication of the available job was received responsive to a user inputting the job using a drag-and-drop request.

3. The method of claim 1, wherein the indication of the available job was transmitted to a plurality of candidate daemons comprising the daemon, and wherein the claim request was authorized responsive to the claim request being a first claim request relative to claim requests from the other daemons of the plurality of candidate daemons.

4. The method of claim 1, further comprising deducting an amount of credits from an account of a user that provided the job that corresponds to the compute resources required by the job.

5. The method of claim 1, wherein the indication of the available job comprises a source code file and indicia of a language.

6. The method of claim 5, further comprising:
    generating a data structure that associates a job identifier for the job, an identifier of the daemon, the source code file, and the indicia of the language; and
    generating for display a selectable option corresponding to the data structure.

7. The method of claim 6, further comprising replicating the job responsive to detecting a selection of the selectable option.

8. The method of claim 1, wherein the node comprises at least one of a container runtime interface (CRI), a cluster scheduler, and a cluster orchestration stack.

9. A non-transitory computer-readable medium comprising memory with instructions encoded thereon that, when executed by one or more processors, cause the one or more processors to perform operations, the instructions comprising instructions to:
    receive, by a daemon, an indication of an available job;
    determine whether the daemon has access to compute resources required by the job;
    responsive to determining that the daemon has access to the compute resources required by the job, transmit a claim request for the job;
    receive, responsive to the claim request, data describing the job;
    generate a container base image based on the data describing the job;
    transmit an instruction to a node to run a containerized instance of the job using the container base image;
    monitor the node for a termination signal;
    responsive to detecting, during the monitoring, the termination signal, upload a result, the result being available to a user that submitted the available job based on the uploading.

10. The non-transitory computer-readable medium of claim 9, wherein the indication of the available job was received responsive to a user inputting the job using a drag-and-drop request.

11. The non-transitory computer-readable medium of claim 9, wherein the indication of the available job was transmitted to a plurality of candidate daemons comprising the daemon, and wherein the claim request was authorized responsive to the claim request being a first claim request relative to claim requests from the other daemons of the plurality of candidate daemons.

12. The non-transitory computer-readable medium of claim 9, the instructions further comprising instructions to deduct an amount of credits from an account of a user that provided the job that corresponds to the compute resources required by the job.

13. The non-transitory computer-readable medium of claim 9, wherein the indication of the available job comprises a source code file and indicia of a language.

14. The non-transitory computer-readable medium of claim 13, the instructions further comprising instructions to:
generate a data structure that associates a job identifier for the job, an identifier of the daemon, the source code file, and the indicia of the language; and
generate for display a selectable option corresponding to the data structure.

15. The non-transitory computer-readable medium of claim 14, the instructions further comprising instructions to replicate the job responsive to detecting a selection of the selectable option.

16. The non-transitory computer-readable medium of claim 9, wherein the node comprises at least one of a container runtime interface (CRI), a cluster scheduler, and a cluster orchestration stack.

17. A system comprising:
memory with instructions encoded thereon; and
one or more processors that, when executing the instructions, are caused to perform operations comprising:
receive, by a daemon, an indication of an available job;
determine whether the daemon has access to compute resources required by the job;
responsive to determining that the daemon has access to the compute resources required by the job, transmit a claim request for the job;
receive, responsive to the claim request, data describing the job;
generate a container base image based on the data describing the job;
transmit an instruction to a node to run a containerized instance of the job using the container base image;
monitor the node for a termination signal;
responsive to detecting, during the monitoring, the termination signal, upload a result, the result being available to a user that submitted the available job based on the uploading.

18. The system of claim 17, wherein the indication of the available job was received responsive to a user inputting the job using a drag-and-drop request.

19. The system of claim 17, wherein the indication of the available job was transmitted to a plurality of candidate daemons comprising the daemon, and wherein the claim request was authorized responsive to the claim request being a first claim request relative to claim requests from the other daemons of the plurality of candidate daemons.

20. The system of claim 17, the operations further comprising deducting an amount of credits from an account of a user that provided the job that corresponds to the compute resources required by the job.

* * * * *